(12) United States Patent
Oh et al.

(10) Patent No.: US 12,217,464 B2
(45) Date of Patent: *Feb. 4, 2025

(54) THREE-DIMENSIONAL DATA ENCODING METHOD AND DEVICE, AND THREE-DIMENSIONAL DATA DECODING METHOD AND DEVICE

(71) Applicant: Samsung Electronics Co., Ltd., Suwon-si (KR)

(72) Inventors: Youngho Oh, Suwon-si (KR); Jihwan Woo, Suwon-si (KR); Sungryeul Rhyu, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 742 days.

This patent is subject to a terminal disclaimer.

(21) Appl. No.: 17/421,704

(22) PCT Filed: Jan. 13, 2020

(86) PCT No.: PCT/KR2020/000595
§ 371 (c)(1),
(2) Date: Jul. 8, 2021

(87) PCT Pub. No.: WO2020/145783
PCT Pub. Date: Jul. 16, 2020

(65) Prior Publication Data
US 2022/0084254 A1    Mar. 17, 2022

(30) Foreign Application Priority Data

Jan. 11, 2019   (KR) .................. 10-2019-0003953

(51) Int. Cl.
*G06K 9/46*    (2006.01)
*G06T 3/40*    (2006.01)
(Continued)

(52) U.S. Cl.
CPC ............... *G06T 9/001* (2013.01); *G06T 3/40* (2013.01); *G06T 9/00* (2013.01); *G06T 17/00* (2013.01);
(Continued)

(58) Field of Classification Search
CPC ............ G06T 3/04; G06T 3/06; G06T 3/067; G06T 3/40; G06T 5/70; G06T 9/00;
(Continued)

(56) References Cited

U.S. PATENT DOCUMENTS 8,290,305 B2   10/2012  Minear et al.
9,811,880 B2   11/2017  Mundhenk et al.
(Continued)

FOREIGN PATENT DOCUMENTS

CN    102317972 A    1/2012
CN    109084746 A    12/2018
(Continued)

OTHER PUBLICATIONS

3DG, "PCC Test Model Category 2 v0", Oct. 2017, ISO/IEC JTC1/SC29/WG11 N17248, 11 pages.
(Continued)

*Primary Examiner* — Eric Rush

(57) ABSTRACT

Provided is a method of processing and transmitting three-dimensional data represented as a point cloud.
The method of encoding three-dimensional (3D) data includes: generating a geometry image indicating position information of points, a texture image indicating color information of the points, and an occupancy map indicating occupancy information of the position information of the points in the geometry image, by projecting the points included in the 3D data onto a two-dimensional (2D) plane; generating a filtered occupancy map by performing filtering on the occupancy map; performing image padding on the
(Continued)

geometry image and the texture image, based on the filtered occupancy map; and generating and outputting a bitstream including a padded geometry image, a padded texture image, a downsampled occupancy map, and information about the filtering performed on the occupancy map.

11 Claims, 9 Drawing Sheets

(51) Int. Cl.
| | | |
|---|---|---|
| *G06T 9/00* | (2006.01) | |
| *G06T 17/00* | (2006.01) | |
| *G06T 17/20* | (2006.01) | |
| *H04N 19/117* | (2014.01) | |
| *H04N 19/44* | (2014.01) | |
| *H04N 19/463* | (2014.01) | |

(52) U.S. Cl.
CPC ........... *G06T 17/20* (2013.01); *H04N 19/117* (2014.11); *H04N 19/44* (2014.11); *H04N 19/463* (2014.11)

(58) Field of Classification Search
CPC ........... G06T 9/001; G06T 9/40; G06T 17/00; G06T 17/20; G06T 2207/10028; G06T 2207/20021; G06T 2207/20024; H04N 19/117; H04N 19/119; H04N 19/134; H04N 19/169; H04N 19/17; H04N 19/176; H04N 19/184; H04N 19/44; H04N 19/46; H04N 19/463; H04N 19/59; H04N 19/597
USPC ....... 382/100, 154, 162, 166, 232, 233, 238, 382/239, 243–246, 254, 260, 276, 285, 382/298–300, 302–304, 325; 345/419, 345/424, 428, 581, 582, 589, 606, 345/611–615; 375/240
See application file for complete search history.

(56) References Cited

U.S. PATENT DOCUMENTS

| | | | | |
|---|---|---|---|---|
| 11,523,135 | B2* | 12/2022 | Aflaki Beni | ......... H04N 19/463 |
| 11,747,823 | B2 | 9/2023 | Zhang et al. | |
| 11,915,390 | B2* | 2/2024 | Kuma | ....................... G06T 3/40 |
| 2018/0173239 | A1 | 6/2018 | Yoon et al. | |
| 2018/0268570 | A1 | 9/2018 | Budagavi et al. | |
| 2018/0324240 | A1 | 11/2018 | Fleureau et al. | |
| 2020/0021847 | A1* | 1/2020 | Kim | ..................... H04N 19/597 |
| 2021/0074030 | A1 | 3/2021 | Oh et al. | |
| 2021/0183109 | A1* | 6/2021 | Chevet | ....................... G06T 9/00 |
| 2021/0185331 | A1* | 6/2021 | Mammou | ............... G06T 7/248 |
| 2021/0358176 | A1* | 11/2021 | Kuma | ..................... G06T 9/001 |

FOREIGN PATENT DOCUMENTS

| | | | |
|---|---|---|---|
| KR | 10-2014-0060454 A | 5/2014 | |
| KR | 10-2018-0071928 A | 6/2018 | |
| KR | 10-2018-0122947 A | 11/2018 | |
| KR | 10-2019-0118926 A | 10/2019 | |

OTHER PUBLICATIONS

Supplementary European Search Report dated Apr. 28, 2022 in connection with European Patent Application No. 20 73 8151, 12 pages.
Korean Intellectual Property Office, "Office Action," issued May 15, 2023, in connection with Korean Patent Application No. 10-2019-0003953, 6 pages.
European Patent Office, "Communication under Rule 71(3) EPC," dated Jun. 6, 2023, in connection with European Patent Application No. 20738151.8, 43 pages.
Guede et al., "PCC new proposal: Improve point cloud compression through occupancy map refinement," Document ISO/IEC JTC1/SC29/WG11 MPEG2018/m44779, Oct. 2018, 7 pages.
Eurico Manuel Rodrigues Lopes, "Adaptive Plane Projection for Video-based Point Cloud Coding", Tecnico Lisboa, Thesis to obtain the Masters of Science Degree in Electrical and Computer Engineering, Nov. 2018, 114 pages.
International Search Report dated May 14, 2020 in connection with International Patent Application No. PCT/KR2020/000595, 2 pages.
Written Opinion of the International Searching Authority dated May 14, 2020 in connection with International Patent Application No. PCT/KR2020/000595, 3 pages.
Office Action issued Jun. 28, 2024, in connection with Chinese Patent Application No. 202080013718.8, 12 pages.
Notice of Allowance issued Dec. 17, 2024, in connection with Chinese Patent Application No. 202080013718.8, 7 pages.

* cited by examiner

FIG. 8

$$\frac{1}{256}\begin{bmatrix} 1 & 4 & 6 & 4 & 1 \\ 4 & 16 & 24 & 16 & 4 \\ 6 & 24 & 36 & 24 & 6 \\ 4 & 16 & 24 & 16 & 4 \\ 1 & 4 & 6 & 4 & 1 \end{bmatrix}$$

THREE-DIMENSIONAL DATA ENCODING METHOD AND DEVICE, AND THREE-DIMENSIONAL DATA DECODING METHOD AND DEVICE

CROSS-REFERENCE TO RELATED APPLICATIONS

This application is a 371 of International Application No. PCT/KR2020/000595 filed on Jan. 13, 2020, which claims priority to Korean Patent Application No. 10-2019-0003953 filed on Jan. 11, 2019, the disclosures of which are herein incorporated by reference in their entirety.

BACKGROUND

1. Field

The present disclosure relates to a method and apparatus for processing three-dimensional data. In particular, the present disclosure relates to a method of generating a high-resolution occupancy map from a low-resolution occupancy map in a three-dimensional data processing process.

2. Description of Related Art

A point cloud, which is a method of representing three-dimensional data, means a set of a massive amount of points, and a large amount of three-dimensional data may be represented as a point cloud. A point cloud is a method of representing a point in three dimensions, different from the method of representing a 2D image, and is in the form of a vector that simultaneously includes position coordinates and color. For example, a point cloud may be represented by (x, y, z, R, G, B). As a density increases, a point cloud that forms a spatial configuration by collecting countless color and location data becomes more and more specific, and accordingly has a meaning as one 3D model.

As a point cloud representing three-dimensional data occupies a significant amount of memory and processor resources, a compression method is required to transmit the point cloud. Accordingly, a method of efficiently compressing such three-dimensional data is needed. Furthermore, a method of processing such three-dimensional data is needed.

Provided is a method and apparatus for efficiently processing three-dimensional data. Particularly, provided are a method and apparatus for efficiently compressing three-dimensional data, and a method and apparatus for reconstructing a three-dimensional image by processing the three-dimensional data that is compressed and transmitted in such a way.

SUMMARY

A method of processing and transmitting, by a data transmitting apparatus, three-dimensional (3D) data represented as a point cloud, according to an embodiment of the present disclosure, includes: generating patches based on a normal vector of each point included in a point cloud; packing generated patches; generating geometry two-dimensional (2D) image information, color 2D image information, and occupancy map information having occupancy information indicating the position of a meaningful point in 2D image information, with respect to geometry information, based on the packed patches; performing image padding to fill information about an empty portion in the geometry 2D image information and the color 2D image information; performing video compression on the image padded geometry 2D image information and color 2D image information and the occupancy map information; and combining compressed video data and compressed added data.

A method of processing compressed three-dimensional (3D) data, by a data receiving apparatus, according to an embodiment of the present disclosure, includes: separating data received as an input of the receiving apparatus into geometry two-dimensional (2D) image information, compressed color 2D image information, compressed occupancy map information, and compressed added information, with respect to compressed geometry information; performing video decompression on compressed geometry 2D image information, color 2D image information, and occupancy map information; reconstructing geometry 3D data from decompressed data; and reconstructing 3D data including color information.

A method of decoding three-dimensional (3D) data according to an embodiment of the present disclosure includes: generating a geometry image indicating position information of points, a texture image indicating color information of the points, and an occupancy map indicating occupancy information of the position information of the points in the geometry image, by projecting the points included in the 3D data onto a two-dimensional (2D) plane; generating a filtered occupancy map by performing filtering on the occupancy map; performing image padding on the geometry image and the texture image based on the filtered occupancy map; and generating and outputting a bitstream including a padded geometry image, a padded texture image, a downsampled occupancy map, and information about filtering performed on the occupancy map.

A method of decoding three-dimensional (3D) data according to an embodiment of the present disclosure includes: receiving a bitstream; obtaining, from the bitstream, a texture image, a geometry image, an occupancy map, and filtering information; generating a filtered occupancy map by performing filtering on the occupancy map, based on the filtering information; reconstructing position information of points based on the geometry image and the filtered occupancy map; and reconstructing 3D data by reconstructing color information of the points with reconstructed position information, based on the texture image.

According to the present disclosure, a data transfer rate may be reduced through efficient compression and transmission of three-dimensional data. Accordingly resources may be saved, and storage space, transmission time, hardware costs, and the like may be reduced. Furthermore, according to the present disclosure, a 3D image may be accurately reconstructed by processing data that is compressed and transmitted.

The effects of the present disclosure are not limited to the above-described effects, and other various effects that are not described may be clearly understood from the following descriptions by one of skill in the art to which the present disclosure belongs.

BRIEF DESCRIPTION OF THE DRAWINGS

FIG. 8 illustrates an example of a filter used for 2D filtering, according to an embodiment.

DETAILED DESCRIPTION

Figure 1:
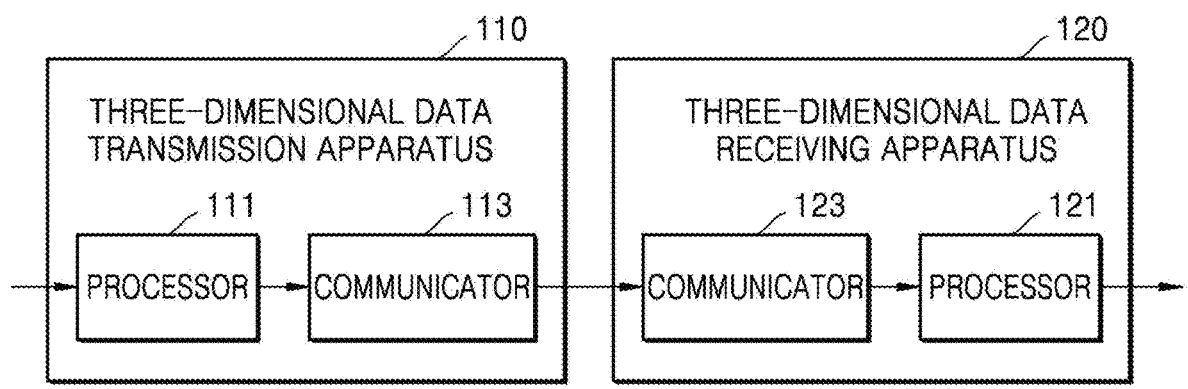
FIG. 1 illustrates a system for transceiving three-dimensional data, according to an embodiment.

A method of encoding three-dimensional (3D) data according to an embodiment includes: generating a geometry image indicating position information of points, a texture image indicating color information of the points, and an occupancy map indicating occupancy information of the position information of the points in the geometry image, by projecting the points included in the 3D data onto a two-dimensional (2D) plane; generating a filtered occupancy map by performing filtering on the occupancy map; performing image padding on the geometry image and the texture image, based on the filtered occupancy map; and generating and outputting a bitstream including a padded geometry image, a padded texture image, a downsampled occupancy map, and information about filtering performed on the occupancy map.

The terms used in the specification are merely used to describe embodiments, and are not intended to limit the disclosure. An expression used in the singular encompasses the expression of the plural, unless it has a clearly different meaning in the context.

Unless defined otherwise, all terms used herein including technical or scientific terms have the same meanings as those generally understood by those of ordinary skill in the art to which the disclosure may pertain. The terms as those defined in generally used dictionaries are construed to have meanings matching that in the context of related technology and, unless clearly defined otherwise, are not construed to be ideally or excessively formal.

The disclosure may be described in terms of functional block components and various processing steps. Such functional blocks may be realized by any number of hardware and/or software components configured to perform the specified functions. For example, the functional blocks of the present disclosure may be implemented by one or more microprocessors, or by circuit configurations for a predetermined function. Furthermore, for example, the functional blocks of the present disclosure may be implemented in various programming or scripting languages. The functional blocks may be implemented as algorithms running on one or more processors. Furthermore, the present disclosure may employ conventional technologies for electronic environment setting, signal processing, and/or data processing, and the like.

Furthermore, connection lines or connection members between the constituent elements shown in the drawings are merely illustrative of functional connections and/or physical or circuit connections. In an actual device, a connection between the constituent elements may be indicated by various functional connections, physical connections, or circuit connections that can be replaced or added.

As used herein, "image" may include all of a still image, a video, a video frame, and/or a video stream, and may include both a 2D frame and a 3D frame. For example, "image" may include a 3D frame expressed as a point cloud.

The term "image" used throughout this specification is not only used as the term "image" itself, but also used as a generic term to describe various types of video or image information that may be known in the related field, such as "picture", "frame", "field" or "slice", and the like. For example, "image" may mean one of a plurality of pictures or a plurality of frames, constituting a video stream, and may mean the entire video stream including a plurality of pictures or a plurality of frames.

Hereinafter, the present disclosure will be described in detail with reference to the accompanying drawings.

A 2D image may be expressed as a set of pixels having color values. A 3D image may be expressed as a set of voxels having color values. Image data expressed as a set of points (or voxels) having color values in a three-dimensional space is called a point cloud. As a point cloud contains information in a three-dimensional space, the point could is composed of vectors in a dimension one step higher than a 2D image, and has a characteristic of having a larger amount of data. Accordingly, in order to provide the point cloud quickly, accurately, and efficiently to users, research on highly efficient compression technology is being actively conducted.

The MPEG-I Part 5 Point Cloud Compression (PCC) group of the Moving Picture Experts Group (MPEG), an international standard organization, is in the process of standardizing technologies for point cloud compression. Point cloud compression technology may be classified into various categories according to the characteristics of data. Among various compression technologies, a method of converting a point cloud into a 2D image and compressing the converted 2D image using an existing video compression technology, for example, HEVC and the like, is introduced in the standardization conference.

FIG. 1 illustrates a system for transceiving three-dimensional data, according to an embodiment.

A three-dimensional data communication system according to an embodiment may include a three-dimensional data transmission apparatus 110 and a three-dimensional data receiving apparatus 120. The three-dimensional data transmission apparatus 110 and the three-dimensional data receiving apparatus 120 may be connected through a network, and may transceive three-dimensional data. Three-dimensional data may be converted into two-dimensional data and then compressed to be transmitted to the three-dimensional data receiving apparatus 120 via a network. The three-dimensional data receiving apparatus 120 may reconstruct the three-dimensional data based on the received data.

The three-dimensional data transmission apparatus 110 according to an embodiment may be a three-dimensional image encoding apparatus that encodes three-dimensional data. As illustrated in FIG. 1, the three-dimensional data transmission apparatus 110 according to an embodiment may include a processor 111 and a communicator 113. The processor 111 of the three-dimensional data transmission apparatus 110 according to an embodiment may obtain and encode three-dimensional data. The processor 111 of the three-dimensional data transmission apparatus 110 may generate compressed bitstream by processing the three-dimensional data. The communicator 113 of the three-dimensional data transmission apparatus 110 may output a bitstream of compressed information about the three-dimensional data.

Although FIG. 1 illustrates that the three-dimensional data transmission apparatus 110 according to an embodiment includes one processor 111, the present disclosure is not limited to the embodiment illustrated in FIG. 1. The three-dimensional data transmission apparatus 110 according to an embodiment of the present disclosure may include a plurality of processors, the operations described below may be performed by a plurality of processors.

The processor 111 of the three-dimensional data transmission apparatus 110 may separate three-dimensional data into geometry information including position information and other attribute information such as a color and the like. For example, when three-dimensional data includes a point cloud image, the processor 111 may separate the three-dimensional data into geometry information indicating position coordinates of points and other attribute information indicating a color.

The processor 111 may group points by using at least one of proximity between points or geometrical characteristics of points, based on the geometry information. For example, the geometrical characteristics of points may include whether the points belong to the same plane and/or the direction of a normal vector of each point, and the like. The processor 111 may group points included in the three-dimensional data into a plurality of segments.

The processor 111 may project the segments onto a 2D plane. Each segment may be projected onto a predefined plane, considering geometry information of a point included in the segment. The processor 111 may generate patches by projecting each of a plurality of segments onto at least one 2D plane.

The processor 111 may generate a geometry image that a 2D video encoder can process, by combining patches including 2D information projected onto the plane. The processor 111 may generate a geometry image by packing the patches.

For example, the processor 111 of FIG. 1 may use a predetermined surface thickness value, to project a point cloud onto a plane. The processor 111 may perform projection only on points having depth values within the predetermined surface thickness value from a surface. The processor 111 may generate a D0 image (position information image) by projecting a point located on a surface of an object that a point cloud indicates. The processor 111 may generate the D0 image (position information image) by gathering patches indicating depth values of a point located on a surface of an object. The processor 111 may generate a D1 image (thickness information image) by projecting points having the greatest depth value within a preset surface thickness value from a surface. The processor 111 may generate the D1 image (thickness information image) by gathering patches indicating depth values of the points. The processor 111 may not store depth value of a point (in-between point) existing within a preset surface thickness value from a surface of an object.

A geometry image indicating position information of points included in a point cloud may include the D0 image and the D1 image that are described above.

The processor 111 may compress 2D image information. For example, the processor 111 may compress 2D image information by using existing video compression technologies including HEVC and the like.

The processor 111 may decompress the compressed 2D geometry image and then reconstruct the decompressed geometry image back to three-dimensional data.

The processor 111 may generate a texture image with respect to other attributes by a method similar to the method used to generate a geometry image, by using the reconstructed three-dimensional data and other attribute data, for example, color information. For example, like a texture image 201 illustrated in FIG. 2, the processor 111 may generate a texture image indicating color information of points included in a point cloud.

The processor 111 may output a bitstream including compressed geometry information and compressed other attribute information. The communicator 113 may transmit a bitstream including the compressed geometry information and the compressed other attribute information. The three-dimensional data receiving apparatus 120 according to an embodiment may include a 3D image decoding apparatus for encoding three-dimensional data. As illustrated in FIG. 1, the three-dimensional data receiving apparatus 120 according to an embodiment may include a processor 121 and a communicator 123. The three-dimensional data receiving apparatus 120 according to an embodiment may obtain and decode three-dimensional data. In the three-dimensional data receiving apparatus 120, the communicator 123 may receive a bitstream and the processor 121 may reconstruct and output three-dimensional data by processing the bitstream.

Although FIG. 1 illustrates that the three-dimensional data receiving apparatus 120 according to an embodiment includes one process as the processor 121, the present disclosure is not limited to the embodiment of FIG. 1. The three-dimensional data receiving apparatus 120 according to an embodiment of the present disclosure may include a plurality of processors, and the operations described below may be performed by a plurality of processors.

The communicator 123 of the three-dimensional data receiving apparatus 120 according to an embodiment may receive a bitstream with compressed three-dimensional data information. For example, the communicator 123 of the three-dimensional data receiving apparatus 120 may receive a bitstream from the three-dimensional data transmission apparatus 110 (or an image encoding apparatus) via a network.

The processor 121 of the three-dimensional data receiving apparatus 120 according to an embodiment may obtain compressed and encoded three-dimensional data from the received bitstream and decode the obtained data. The processor 121 may generate and output a 3D image (or 3D point cloud data) by reconstructing the encoded three-dimensional data. For example, the processor 121 according to an embodiment may output from a bitstream a 3D image including the reconstructed 3D frames. The processor 121 may output a 3D image on a display based on the three-dimensional reconstruction data.

The processor 121 according to an embodiment may obtain compressed three-dimensional data from a bitstream. The processor 121 may decompress the compressed three-dimensional data. The processor 121 may obtain a geometry image, a texture image, an occupancy map, and auxiliary information, by decompressing data included in a bitstream.

For example, the processor 121 may include a de-multiplexer (DE-MUX) that obtains, when a bitstream is received, a compressed geometry image, a compressed texture image, a compressed occupancy map, compressed auxiliary information, from a bitstream. The processor 121 may include a decompressor that decompresses pieces of compressed information.

The processor 121 may generate three-dimensional reconstruction data by reconstructing the geometry image. The processor 121 may generate three-dimensional reconstruction data with points arranged in a three-dimensional space, based on the decompressed geometry image and the decompressed occupancy map.

The processor 121 may generate and output three-dimensional data based on the three-dimensional reconstruction data and the texture image. The processor 121 may generate three-dimensional data by applying color information of the points included in a texture image to the points included in the three-dimensional reconstruction data. The generated three-dimensional data may be in the form of point cloud.

Figure 2:
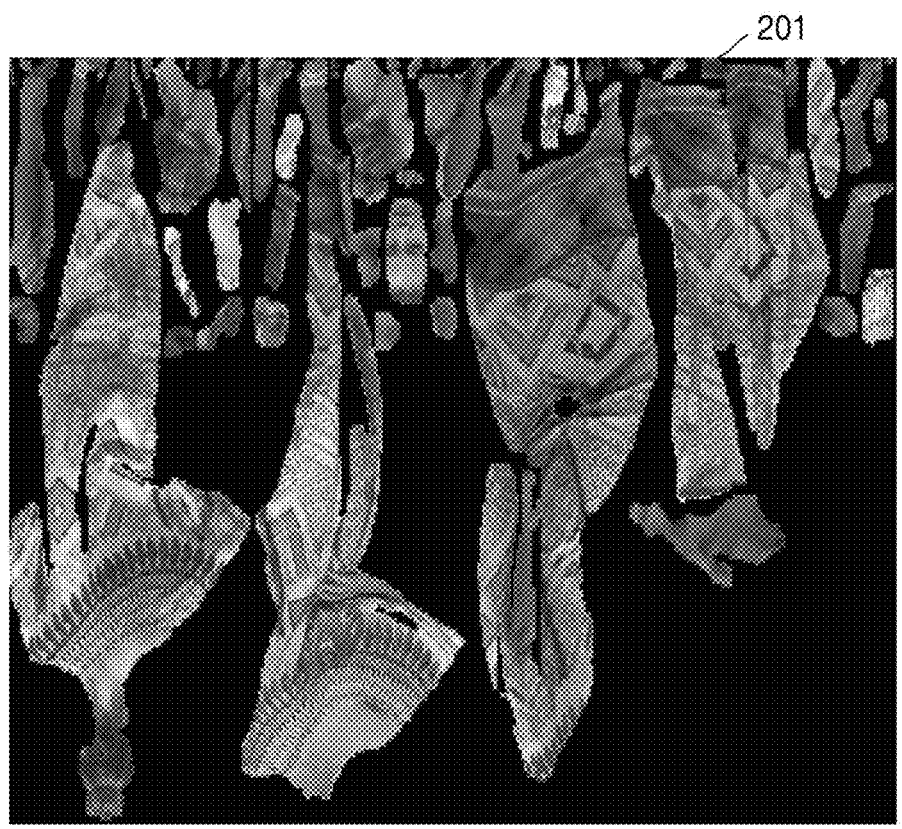
FIG. 2 illustrates a two-dimensional image generated by projecting three-dimensional data onto a plane.

FIG. 2 illustrates a 2D image generated by projecting three-dimensional data onto a plane in the three-dimensional data transmission apparatus 110.

FIG. 2 illustrates color 2D image information. In the present disclosure, the geometry 2D image information may include a geometry image indicating position information of points of a point cloud, and the color 2D image information may include a texture image indicating color information of points of a point cloud.

In the following description, a method of processing 3D data represented in the form of a point cloud according to an embodiment is described with reference to FIGS. 3 and 4.

Figure 3:
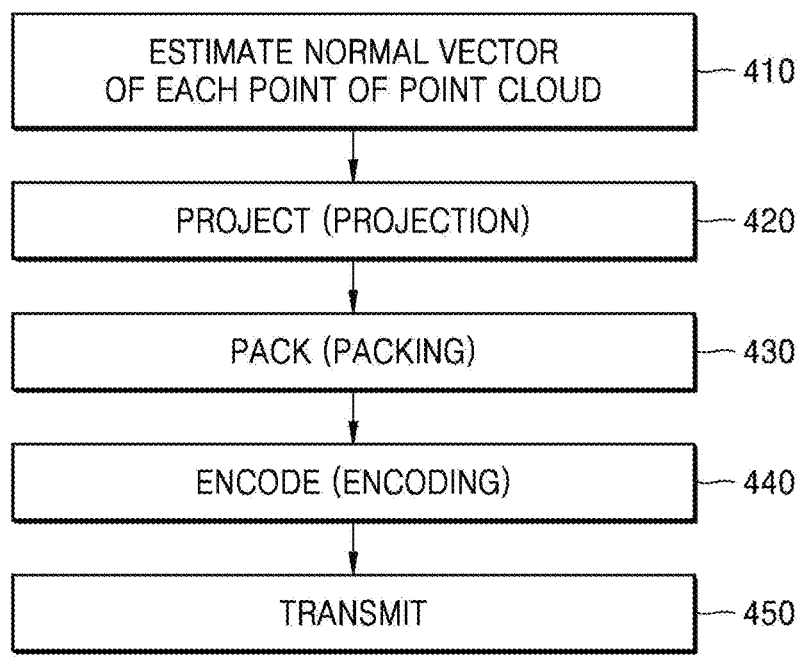
FIG. 3 is a flowchart of a method of encoding and transmitting three-dimensional data, according to an embodiment.

FIG. 3 is a schematic flowchart of a method of processing transmission of a 3D image represented as a point cloud, according to an embodiment of the present disclosure. FIG. 4 is a block diagram of an encoder for encoding 3D data represented as a point cloud, according to an embodiment of the present disclosure. The three-dimensional data encoding apparatus of FIG. 4 may be included in the three-dimensional data transmission apparatus 110 of FIG. 1. The descriptions of the operation and function performed by the processor 111 of the three-dimensional data transmission apparatus 110 of FIG. 1 may be applied to the three-dimensional data encoding apparatus of FIG. 4. Redundant descriptions are omitted.

Figure 4:
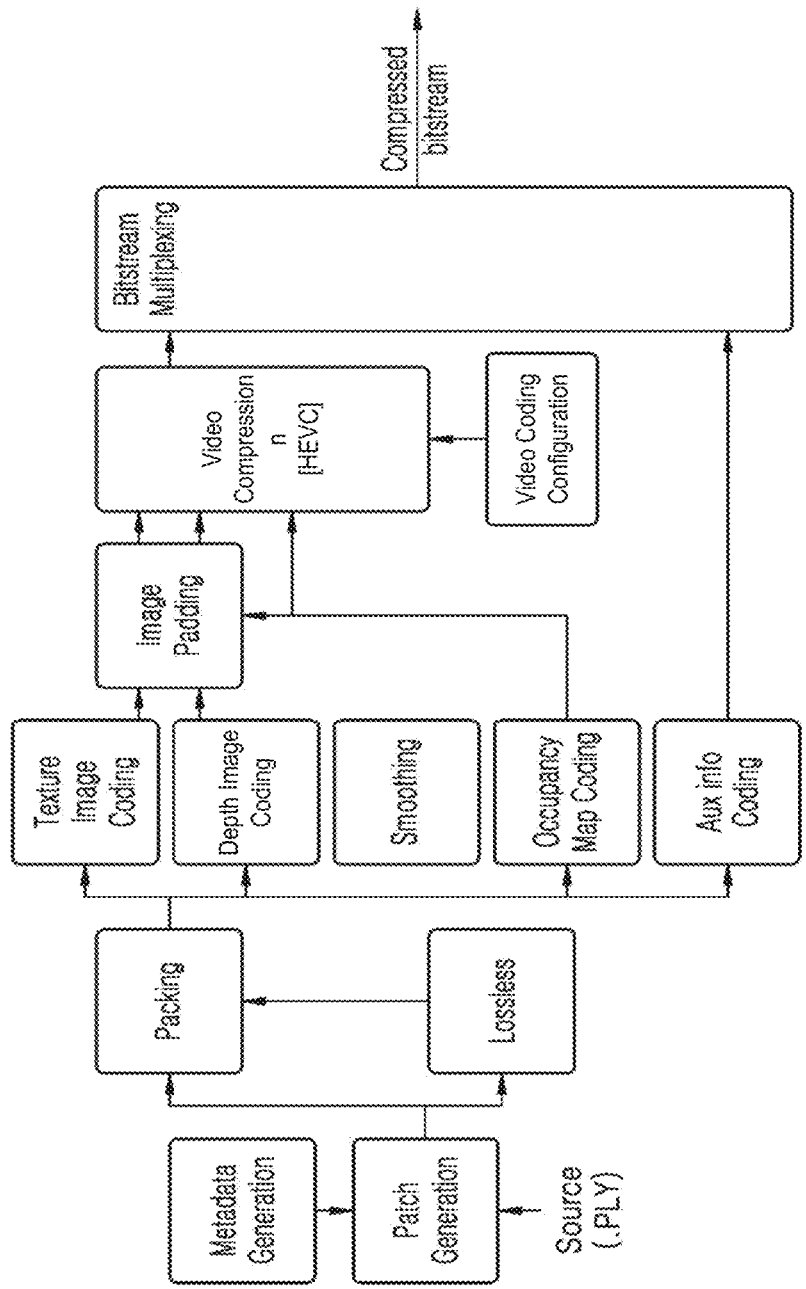
FIG. 4 is a block diagram of a three-dimensional data encoding apparatus, according to an embodiment.

Some or all of the blocks illustrated in FIGS. 3 and 4 may be implemented with hardware and/or software components that execute specific functions. Functions performed by the blocks illustrated in FIG. 4 may be implemented by at least one microprocessor included in an electronic device, or may be implemented by circuit components for the corresponding function. Some or all of the blocks illustrated in FIG. 4 may be a software module including various programming languages or script languages running on a processor.

According to FIG. 3, a method of encoding three-dimensional data may include estimating a normal vector of each point included in a point cloud that is source data (410), generating patches by projecting the points based on the normal vectors (420), packing the generated patches (430), and generating, based on the packed patches, geometry 2D image information, color 2D image information, and an occupancy map having occupancy information indicating the position of a meaningful point in the geometry 2D image information, with respect to geometry information. According to an embodiment, the method of encoding three-dimensional data may include encoding the generated geometry 2D image information, color 2D image information, and geometry 2D image information (440) and transmitting the encoded information (450).

The patch generation block of FIG. 4 may project the points included in three-dimensional data onto a 2D plane. The patch generation block may group the points included in three-dimensional data into a plurality of segments, and project the segments onto a 2D plane. The patch generation block may generate patches by projecting each of the segments onto at least one 2D plane.

The patch generation block may generate an occupancy map to distinguish an area where points of a pint cloud are projected and an area where points of a pint cloud are not projected, in a 2D image projected during a patch generation process.

The packing block may pack the generated patches.

A texture image coding block, a depth image coding block, an occupancy map coding block, and an auxiliary information coding block may respectively generate an encoded texture image (or a color information image), a coded geometry image (or a depth image), an encoded occupancy map, and encoded auxiliary information. The geometry image may indicate position information of points, the texture image may indicate color information of points, and the occupancy map may indicate occupancy information of position information of points in the geometry image.

The occupancy map coding block may perform filtering on the occupancy map and generate a filtered occupancy map. For example, the occupancy map coding block may downsample an occupancy map according to occupancy precision, or perform upsampling and filtering on the downsampled occupancy map.

An image padding block may perform image padding of filling information about an empty portion in the texture image and the geometry image. The image padding block may perform dilation on the texture image and the geometry image by removing discontinuity between patches to improve compression performance. For example, the image padding block may generate a dilated texture image by performing dilation on an empty portion between patches of a texture image.

Furthermore, the image padding block may perform image padding on the geometry image and the texture image, based on the occupancy map filtered in the occupancy map coding block.

A video compression block may compress the 2D image information generated by processing the three-dimensional data.

The video compression block may compress the padded geometry image, the padded texture image, and the downsampled occupancy map.

A bitstream multiplexing block may generate and output a bitstream based on the geometry image, the texture image, the occupancy map, and the auxiliary information. The bitstream multiplexing block may generate and output a bitstream including the filtering performed on the padded geometry image, the padded texture image, the downsampled occupancy map, and information about filtering performed on the occupancy map.

As described above, the point cloud may include data indicating position and color of some points in a three-dimensional space. Accordingly, the geometry information and the color information of a point cloud is recorded only on some points in the 2D image generated by projecting points of a point cloud onto a 2D plane.

Accordingly, as illustrated in FIG. 2, geometry 2D image information and color 2D image information with respect to geometry information do not present in all points of the 2D image. Thus, an occupancy map that indicates an area where the points of a point cloud are projected onto a 2D image and an area where the points of a point cloud are not projected onto the 2D image is necessary.

Figure 5:
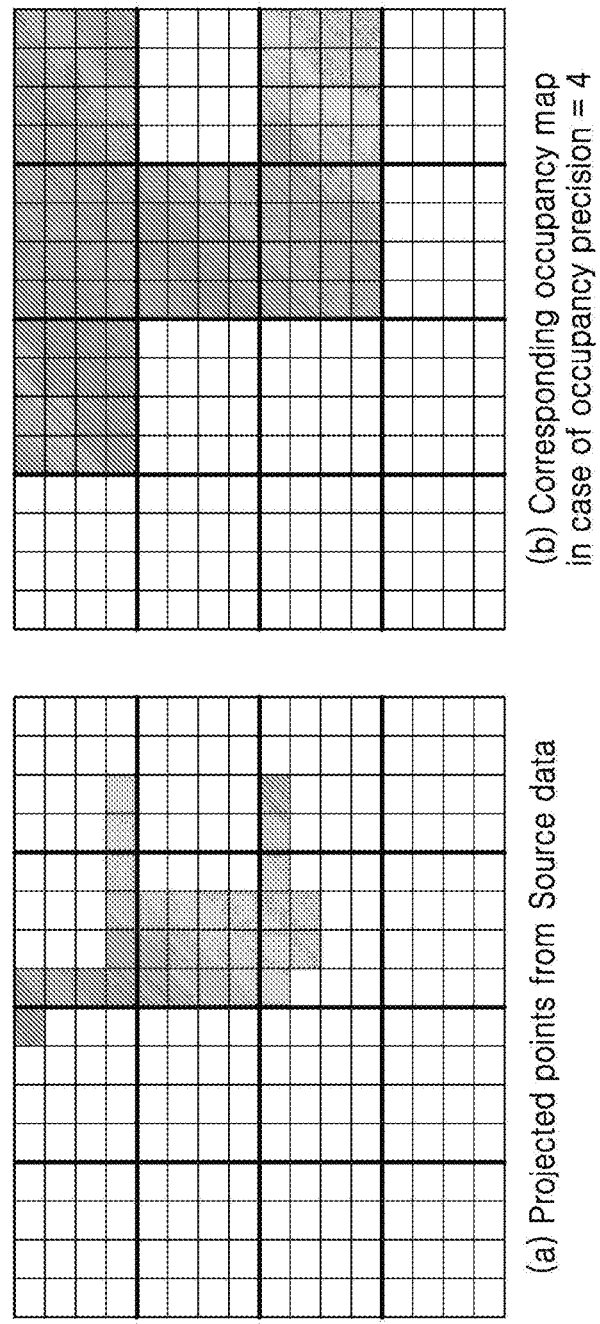
FIG. 5 illustrates an occupancy map indicating points projected from source data and an occupancy map corresponding to a case in which occupancy precision is 4.

FIG. 5 illustrates an occupancy map corresponding to a case in which occupancy precision that is a parameter regarding the occupancy map is 4.

The occupancy precision represents the resolution of an occupancy map. For example, when the occupancy precision is N, and even one project point exists in a block of horizontally N pixels and vertically N pixels, the entire N×N block may be filled with 1.

As the occupancy map is data indicating the positions of projected points in the 2D image information, the occupancy map is transmitted by being lossless compressed. Accordingly, to reduce the size of a compressed occupancy map, instead of 1, an N value may be used as an occupancy precision value. When the occupancy precision is N, and even one project point exists in a block of horizontally N pixels and vertically N pixels, a downsampling method of filling the entire N×N block with 1 may be used. Using the N value, instead of 1, as an occupancy precision value may mean that the occupancy map is downsampled to a 1/(N×N) size.

As illustrated in FIG. 5, when the N value, instead of 1, is used as an occupancy precision value, the number of projected points represented by the occupancy map may increase. For example, (a) of FIG. 5 illustrates an occupancy map indicating points projected from source data. The occupancy precision of the occupancy map illustrated in (a) of FIG. 5 is 1. The occupancy map of (a) of FIG. 5 shows 30 projected points. (b) of FIG. 5 illustrates an occupancy map generated when occupancy precision is 4. The occupancy map of (b) of FIG. 5 shows 96 projected points.

Accordingly, as the number of projected points shown in an occupancy map increases, the compression sizes of geometry 2D image information and color 2D image information reflecting the occupancy map increase as well. In other words, when occupancy precision is not 1, the compression size of an occupancy map decreases, but the compression sizes of 2D image information and color 2D image information with respect to geometry information increase.

Figure 6:
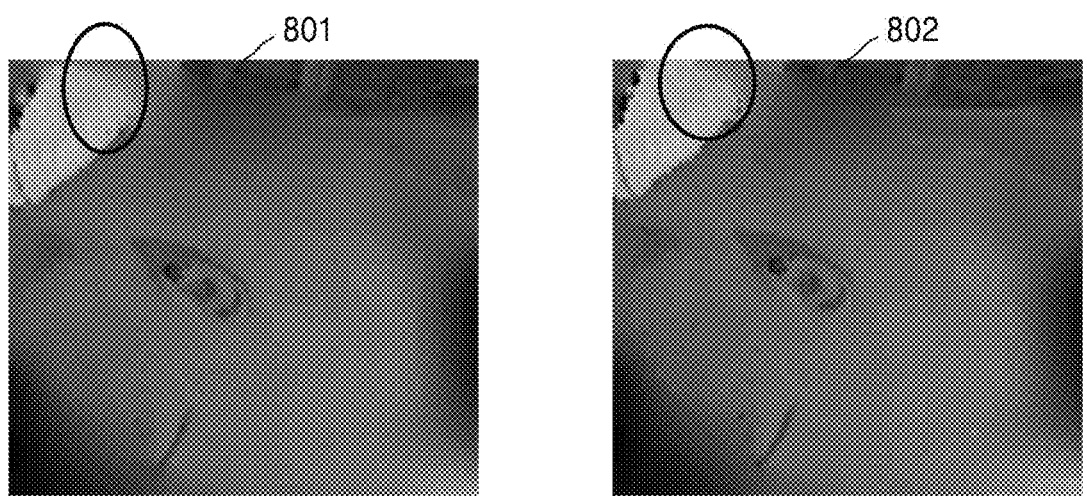
FIG. 6 illustrates a texture image to which unnecessary information is added due to a downsampled occupancy map.

FIG. 6 illustrates a texture image to which unnecessary information is added by a downsampled occupancy map. An image 801 of FIG. 6 illustrates a texture image to which an occupancy map having occupancy precision of 1 is applied. An image 802 illustrates a texture image to which an occupancy map having occupancy precision of 4 is applied. As shown by a circular portion in each of the image 801 and the image 802 of FIG. 6, when occupancy precision is not 1, unnecessary information may be added to the texture image.

Accordingly, according to an embodiment of the present disclosure, when an occupancy precision value is not 1 (that is, when it is a low-resolution occupancy map), a method of removing an added point by filtering (or estimating) an occupancy map to be a high-resolution occupancy map, which is similar to an occupancy map having a precision value of 1, is proposed. According to an embodiment of the present disclosure, without changing the compression size of an occupancy map, the number of points represented by an occupancy map may be reduced. Accordingly, the compression sizes of the 2D image information and the color 2D image information with respect to geometry information may be reduced.

Figure 7:
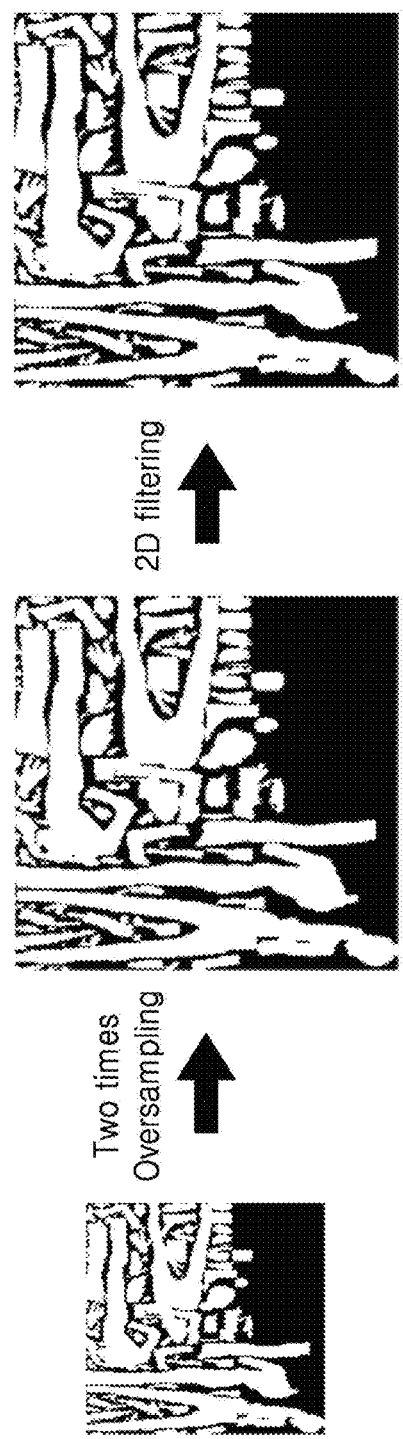
FIG. 7 illustrates a process of performing oversampling and filtering on an occupancy map, according to an embodiment.

FIG. 7 illustrates two-time upsampling (or oversampling) and 2D filtering of an occupancy map, used in a method of encoding three-dimensional data, according to an embodiment of the present disclosure. An occupancy precision value is set to a value of 2(N−1) such as 1, 2, 4, 8, and the like. N is 0 and a positive integer.

According to an occupancy precision value, the two-time upsampling and the 2D filtering illustrated in FIG. 7 may be repeated.

For example, when geometry 2D image information and color 2D image information have an image size of 1280× 1280, the size of an occupancy map having an occupancy precision value of 4 is an image size of 320×320 that is horizontally ¼ times and vertically ¼ times. According to the method of encoding three-dimensional data according to an embodiment, when an occupancy precision value is 4, an occupancy map having an image size of 640×640 may be generated through the first two-time upsampling and 2D filtering, and an occupancy map having an image size of 1280×1280 may be generated through the second two-time upsampling and 2D filtering with respect to the generated occupancy map.

The filtering performed in FIG. 7 may have the following conditions.

In the case when an output value of filtering is a threshold or less, the output value may be changed to 0 when an original value is 1, and may maintain 0 when the original value is 0. In the case when the output value of filtering is a threshold or more, the output value may maintain 1 when the original value is 1, and may maintain 0 when the original value is 0. In other words, according to an embodiment of the present disclosure, in performing 2D filtering on an upsampled occupancy map, an area having a value of 0 of the upsampled occupancy map may maintain the value of 0, regardless of a filtering result.

Furthermore, the upsampling may be performed by one step, not through multiple steps. In the above description, instead of a method of reconstructing the map to the original through two steps of ¼ times and ½ times, a method of directly expanding the horizontal and vertical sizes by 4 times is possible. In this state, a smoothing filter for removing noise may be employed before and after reconstruction, and the smoothing filter may be calculated using a pixel value and a weighted average of nearby pixel values. The nearby pixel values used to remove noise may be determined by defining in advance a range of nearby pixel values, or by adaptively differing the size of a nearby area according to the structure of a content.

The filter of FIG. 8 may include a 2D filter used for 2D filtering with respect to the occupancy map according to an embodiment of the present disclosure. The size and value of a filter may be defined in advance or adaptively changed according to a content. For example, in performing 2D filtering, a method of newly updating a pixel value by calculating a weighted average based on a pixel value and nearby pixel values may be used.

An occupancy map filtering operation may be identically performed in a transmitter (or a three-dimensional data encoding apparatus) and a receiver (or a three-dimensional data decoding apparatus). To perform the same filtering on an occupancy map in each of a transmitter and a receiver, the following parameters may be used. A three-dimensional data encoding apparatus may transmit the following parameters together when encoding and transmitting three-dimensional data.

occupancy_map_filtering_flag
occupancy_map_filtering_number
occupancy_map_filtering_threshold The occupancy_map_filtering_flag indicates whether to undergo a process of two-time upsampling and 2D filtering when compressing and transmitting an occupancy map. The occupancy_map_filtering_number indicates the number of performing the two-time upsampling and 2D filtering process. The occupancy_map_filtering_threshold may indicate a discriminant value used in 2D filtering.

The occupancy map coding block of FIG. 4, which indicates an encoder, may perform a downsampling process on an occupancy map in units of blocks according to occupancy precision, after padding is generated. A downsampled occupancy map may be compressed by a video encoder such as HEVC. The occupancy map coding block may generate an occupancy map filtered through the two-time upsampling and 2D filtering on the downsampled occupancy map, and transfer a filtered occupancy map to an image padding block. The transferred filtered occupancy map may be used for image padding. The use of the two-time upsampling and 2D filtering may be recorded in the occupancy map filtering flag.

At this time, the value of occupancy_map_filtering_number is determined according to the number of performing the two-time upsampling and 2D filtering. When the occupancy_map_filtering_flag does not instruct use of the two-time upsampling and 2D filtering process, the two-time upsampling and 2D filtering process is not performed.

Figure 9:
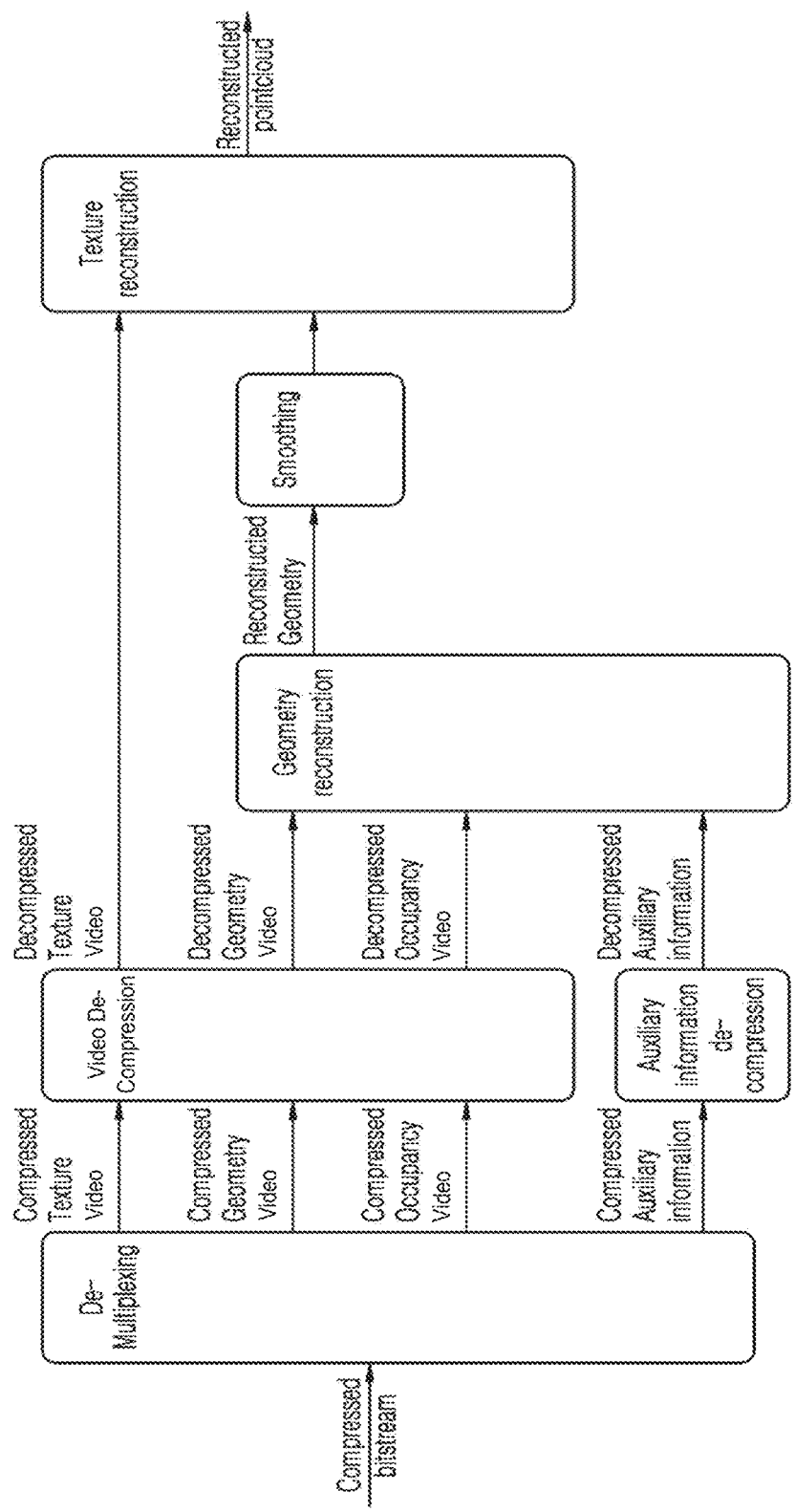
FIG. 9 is a block diagram of an apparatus for decoding three-dimensional data, according to an embodiment.

In FIG. 9 illustrating a decoder, when the occupancy_map_filtering_flag instructs use of the two-time upsampling and 2D filtering process with respect to a decoded occupancy map, a video decompression block may perform the two-time upsampling and 2D filtering on the decoded occupancy map. A filtered occupancy map generated by performing the two-time upsampling and 2D filtering is transferred to a geometry reconstruction block. At this time, the number of performing the two-time upsampling and 2D filtering is determined according to a value of the occupancy_map_filtering_number.

In the process of performing 2D filtering on an occupancy map in the encoder and the decoder, the value 0 and the value 1 may be determined according to a value of the occupancy_map_filtering_threshold.

According to an embodiment of the present disclosure, whether to perform 2D filtering with a patch unit may be determined. The three-dimensional data encoding apparatus according to an embodiment of the present disclosure may perform upsampling or upsampling and 2D filtering in units of patches included in a downsampled occupancy map, not the entire downsampled occupancy map.

The three-dimensional data encoding apparatus according to an embodiment of the present disclosure may determine whether to perform 2D filtering based on the size of a patch or the number of 1's included in a patch. When the size of a patch or the number of 1's included in a patch is small, it is highly likely that the patch represents a very complex shape. Accordingly, in the case of a small patch with a complex shape, when upsampling and 2D filtering is performed on an occupancy map, it is highly likely to obtain an output that is completely different from the original.

Accordingly, only when the size of a patch or the number of 1's included in a patch is a threshold or more, the three-dimensional data encoding apparatus according to an embodiment of the present disclosure may perform upsampling and 2D filtering on a downsampled occupancy map. When the size of a patch or the number of 1's included in a patch is less than the threshold, the three-dimensional data encoding apparatus may perform only upsampling on the downsampled occupancy map.

Furthermore, the three-dimensional data encoding apparatus according to an embodiment of the present disclosure may perform upsampling and 2D filtering, step by step, according to the size of a patch or the number of 1's included in a patch.

For example, in the case when the occupancy precision of the three-dimensional data encoding apparatus is 4, when the size of a patch or the number of 1's included in a patch is a first threshold or more, the three-dimensional data encoding apparatus may perform two-time upsampling and 2D filtering on a four-time downsampled occupancy map. When the size of a patch or the number of 1's included in a patch is less than the first threshold, three-dimensional data encoding apparatus may perform only two-time upsampling on the four-time downsampled occupancy map. When the size of a patch or the number of 1's included in a patch is a second threshold or more, the three-dimensional data encoding apparatus may perform two-time upsampling and 2D filtering on an occupancy map that is four-time downsampled and then two-time upsampled. When the size of a patch or the number of 1's included in a patch is less than the first threshold, the three-dimensional data encoding apparatus may perform only two-time upsampling on the occupancy map that is four-time downsampled and then two-time upsampled.

FIG. 9 is a block diagram of a decoder for decoding three-dimensional data represented as a point cloud, according to an embodiment of the present disclosure. The three-dimensional data decoding apparatus of FIG. 9 may be included in the three-dimensional data receiving apparatus 120 of FIG. 1. The descriptions of the operation and function performed by the processor 121 of the three-dimensional data receiving apparatus 120 of FIG. 1 may be applied to the three-dimensional data decoding apparatus of FIG. 9. Redundant descriptions are omitted.

Some or all of the blocks illustrated in FIG. 9 may be implemented with hardware and/or software components that execute specific functions. Functions performed by the blocks illustrated in FIG. 9 may be implemented by at least one microprocessor included in an electronic device, or by circuit components for the corresponding function. Some or all of the blocks illustrated in FIG. 9 may be a software module including various programming languages or script languages running on a processor.

A de-multiplexing block of FIG. 9 may receive a bitstream and obtain, from the bitstream, a texture image, a geometry image, an occupancy map, and filtering information. The filtering information may include information about filtering performed by an encoder on an occupancy map. For example, the auxiliary information may include at least one of the occupancy_map_filtering_flag, the occupancy_map_filtering_number, or the occupancy_map_filtering_threshold.

The de-multiplexing block of FIG. 9 may receive a bitstream and obtain, from the bitstream, a compressed geometry image, a compressed texture image, a compressed occupancy map, and compressed auxiliary information. The auxiliary information may include information about filtering performed by an encoder on an occupancy map.

A video decompression block may decompress pieces of compressed information.

The video decompression block may generate a filtered occupancy map by performing filtering on an occupancy map based on the filtering information. For example, the video decompression block may perform upsampling and filtering on an occupancy map.

A geometry reconstruction block may generate three-dimensional reconstruction data by reconstructing geometry information of points, based on the decompressed geometry image and the decompressed occupancy map. The geometry reconstruction block may reconstruct position information of points, based on the geometry image and the filtered occupancy map.

A texture reconstruction block may generate and output three-dimensional data, based on the three-dimensional reconstruction data and the texture image. The texture reconstruction block may reconstruct three-dimensional data by reconstructing color information of points with reconstructed position information. The texture reconstruction block may generate three-dimensional data by applying the color information of the points included in a texture image to the points included in the three-dimensional reconstruction data. The generated three-dimensional data may be in the form of a point cloud.

The disclosed embodiments may be implemented by an S/W program including instructions stored in computer-readable storage media.

A computer, as a device capable of calling the stored instructions from a storage medium and performing operations according to the disclosed embodiments according to the called instructions, may include a terminal device and a remote control device according to the disclosed embodiments.

The computer-readable storage media may be provided in the form of non-transitory storage media. Here, "non-transitory" merely means that the storage medium does not contain signals and are tangible, but do not distinguish data being semi-permanently or temporarily stored in the storage medium.

Furthermore, electronic apparatuses or methods according to the disclosed embodiments may be provided included in computer program products. A computer program product as goods may be dealt between a seller and a buyer.

A computer program product may include an S/W program or a computer-readable storage medium where the S/W program is stored. For example, a computer program product may include a product in the form of an S/W program, for example, a downloadable application, that is electronically distributed through a manufacturer of a broadcast receiving device or an electronic market, for example, Google Play Store or AppStore. For electronic distribution, at least part of an S/W program may be stored in a storage medium or temporarily generated. In this case, a storage medium may be a manufacturer's server, an electronic market's server, or a storage medium of a relay server that temporarily stores a SW program.

A computer program product may include a server's storage medium or a client device's storage medium in a system including a server and a client device. Alternatively, when there is a third device, for example, a smartphone, communicatively connected to a server or a client device, the computer program product may include a storage medium of the third device. Alternatively, a computer program product may include an S/W program that is transmitted from a server to a client device or a third device, or from the third device to the client device.

In this case, server, any one of the client device and the third device may perform a method according to the disclosed embodiments by executing the computer program product. Alternatively, two or more of the server, the client device, and the third device may perform, in a distribution manner, the method according to the disclosed embodiments by executing the computer program product.

For example, a server, for example, a cloud server or an artificial intelligent server, and the like, executes a computer program product stored in the server, so that the client device communicatively connected to the server may be controlled to perform the method according to the disclosed embodiments.

As another example, a third device executes a computer program product, so that a terminal connected to communication with the third device may control to perform the method according to the disclosed embodiment. In a detailed example, the third device may remotely control a terminal device or a remote control device to transmit or receive a packing image.

When the third device executes the computer program product, the third device may download the computer program product from the server, and execute the downloaded computer program product. Alternatively, the third device may execute the computer program product provided in a preloaded state to perform the method according to the disclosed embodiments.

The invention claimed is:

1. A method of encoding three-dimensional (3D) data, the method comprising:
   generating a geometry image indicating position information of points included in the 3D data, a texture image indicating color information of the points, and an occupancy map indicating occupancy information of the position information of the points in the geometry image, by projecting the points included in the 3D data onto a two-dimensional (2D) plane;
   generating a filtered occupancy map by performing filtering on the occupancy map;
   performing image padding on the geometry image and the texture image, based on the filtered occupancy map; and
   generating and outputting a bitstream including a padded geometry image, a padded texture image, a downsampled occupancy map, and information about the filtering performed on the occupancy map.

2. The method of claim 1, wherein the generating of the occupancy map comprises downsampling an occupancy map based on an occupancy precision value N.

3. The method of claim 2, wherein, in the downsampling, when there is a projected point in a predetermined N*N pixel block, an entire area of the predetermined N*N pixel block of the occupancy map is filled with 1.

4. The method of claim 1, wherein the generating of the filtered occupancy map comprises upsampling the occupancy map based on an occupancy precision value N.

5. The method of claim 4, wherein the generating of the filtered occupancy map further comprises performing 2D filtering on the upsampled occupancy map.

6. The method of claim 5, wherein, in the generating of the filtered occupancy map, whether to perform the 2D filtering is determined based on at least one of a size of an occupancy map patch or a number of 1's included in the occupancy map patch.

7. The method of claim 1, wherein the filtered occupancy map is generated in units of patches.

8. A computer program product comprising one or more non-transitory computer readable recording media having stored therein a program that, when executed by a processor, performs the method of claim 1.

9. An apparatus for encoding three-dimensional (3D) data, the apparatus comprising:
   a memory;
   a communicator; and
   at least one processor,
   wherein the at least one processor is configured to:
      generate a geometry image indicating position information of points included in the 3D data, a texture image indicating color information of the points, and an occupancy map indicating occupancy information of the position information of the points in the geometry image, by projecting the points included in the 3D data onto a two-dimensional (2D) plane;

generate a filtered occupancy map by performing filtering on the occupancy map;

perform image padding on the geometry image and the texture image, based on the filtered occupancy map; and generate and output a bitstream including a padded geometry image, a padded texture image, a downsampled occupancy map, and information about the filtering performed on the occupancy map.

10. A method of decoding three-dimensional (3D) data, the method comprising:

receiving a bitstream;

obtaining, from the bitstream, a texture image, a geometry image, an occupancy map, and filtering information;

generating a filtered occupancy map by performing filtering on the occupancy map, based on the filtering information, wherein the filtering comprises at least one of upsampling or downsampling;

reconstructing position information of points based on the geometry image and the filtered occupancy map; and reconstructing 3D data by reconstructing color information of points with reconstructed position information, based on the texture image.

11. An apparatus for decoding three-dimensional (3D) data, the apparatus comprising:

a memory;

a communicator; and at least one processor, wherein the at least one processor is configured to:

receive a bitstream;

obtain, from the bitstream, a texture image, a geometry image, an occupancy map, and filtering information, generate a filtered occupancy map by performing filtering on the occupancy map based on the filtering information, wherein the filtering comprises at least one of upsampling or downsampling;

reconstruct position information of points based on the geometry image and the filtered occupancy map, and reconstruct 3D data by reconstructing color information of points with reconstructed position information, based on the texture image.

\* \* \* \* \*